US009441743B2

(12) United States Patent  
Storm et al.

(10) Patent No.: US 9,441,743 B2
(45) Date of Patent: Sep. 13, 2016

(54) BISTABLE FLUID VALVE

(75) Inventors: Stefan Storm, Unterschleissheim (DE); Raphael Rammer, Munich (DE)

(73) Assignee: EADS DEUTSCHLAND GMBH, Ottobrunn (DE)

( * ) Notice: Subject to any disclaimer, the term of this patent is extended or adjusted under 35 U.S.C. 154(b) by 83 days.

(21) Appl. No.: 14/345,186

(22) PCT Filed: Aug. 29, 2012

(86) PCT No.: PCT/DE2012/100253
§ 371 (c)(1),
(2), (4) Date: Mar. 14, 2014

(87) PCT Pub. No.: WO2013/037359
PCT Pub. Date: Mar. 21, 2013

(65) Prior Publication Data
US 2014/0345731 A1  Nov. 27, 2014

(30) Foreign Application Priority Data

Sep. 15, 2011 (DE) .................. 10 2011 113 360

(51) Int. Cl.
*F16K 11/02* (2006.01)
*F16K 31/56* (2006.01)
*F16K 31/00* (2006.01)

(52) U.S. Cl.
CPC .............. *F16K 11/02* (2013.01); *F16K 11/022* (2013.01); *F16K 31/003* (2013.01); *F16K 31/56* (2013.01); *Y10T 137/86919* (2015.04)

(58) Field of Classification Search
USPC ........................................ 137/627.5; 251/75
See application file for complete search history.

(56) References Cited

U.S. PATENT DOCUMENTS

| 2,888,877 | A | * | 6/1959 | Shellman et al. | .......... 417/413.1 |
| 3,426,800 | A |   | 2/1969 | Bauer |   |
| 3,635,251 | A | * | 1/1972 | Gaines | ........................ 137/636 |
| 3,770,012 | A | * | 11/1973 | Bitzer et al. | ............. 137/596.16 |
| 3,779,267 | A | * | 12/1973 | Cowan | .......................... 137/111 |
| 3,800,828 | A | * | 4/1974 | Nelson | ........................... 137/625 |
| 3,845,777 | A | * | 11/1974 | Gilson | ..................... 137/119.03 |
| 4,594,890 | A | * | 6/1986 | Baker, Jr. | ........................ 73/232 |
| 4,969,424 | A | * | 11/1990 | Klomp | ......................... 123/73 V |
| 6,340,096 | B1 | * | 1/2002 | Zerfas | .............................. 222/1 |

FOREIGN PATENT DOCUMENTS

DE   29611808 U1   10/1996
FR   2373737 A1   7/1978

OTHER PUBLICATIONS

Corresponding International Application No. PCT/DE2012/100253 Search Report dated Nov. 15, 2012.

* cited by examiner

*Primary Examiner* — John Fox
(74) *Attorney, Agent, or Firm* — Hauptman Ham, LLP

(57) ABSTRACT

A bistable fluid valve is characterized by two valve chambers which are arranged adjacent to one another and are closed off with respect to one another by a partition and each have an inlet opening and an outlet opening situated opposite one another, by an S-shaped elastic strip element which extends through both valve chambers, is articulatedly mounted in the region of the partition and can assume two positions in which it sealingly closes off either one or the other outlet opening, and also by an actuation element which is fastened to the strip element and by means of which the strip element can be switched between the two positions. The fluid valve according to the invention comprises only a single movable component of very low mass, which can thus operate in a fast-reacting manner.

29 Claims, 1 Drawing Sheet

US 9,441,743 B2

BISTABLE FLUID VALVE

RELATED APPLICATIONS

Figure 1:
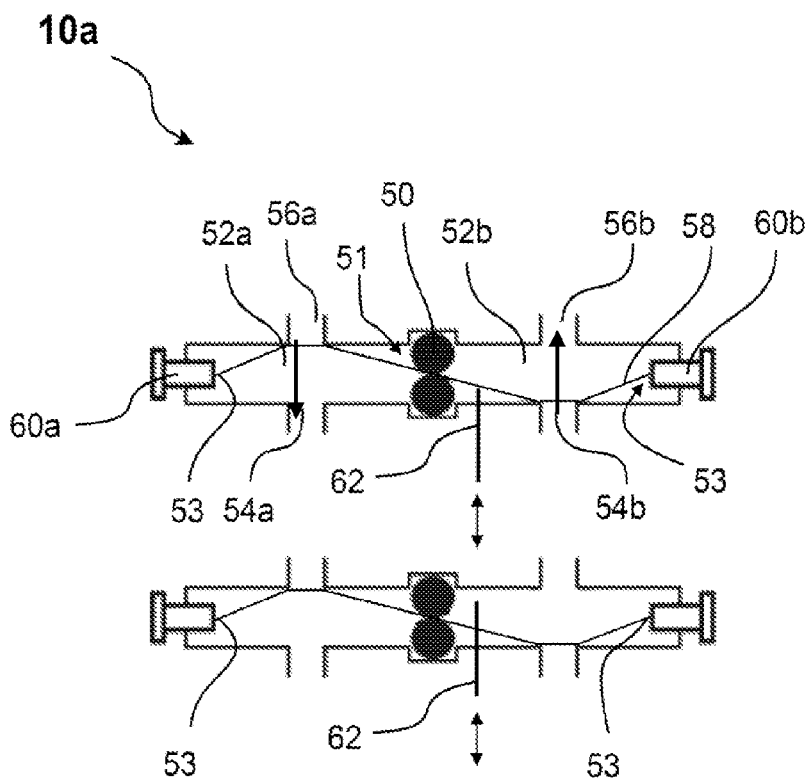

The present application is National Phase of International Application Number PCT/DE2012/100253 filed Aug. 29, 2012, and claims priority to German Application Number 10 2011 113 360.0, filed Sep. 15, 2011.

The invention relates to a bistable fluid valve.

In most hydraulic systems, use is made of directional valves or cut-off valves for reversing or shutting off the volume flow of fluid. A dedicated actuation means, power supply and control electronics are required for the control of the valve. If fast-switching valves for high actuation frequencies are required, there are inevitably high electrical losses for the control of the valves.

Taking this as a starting point, the invention is based on the object of providing a bistable fluid valve which is of structurally simple design and which can operate in a fast-reacting manner owing to low moving masses.

The invention emerges from the features of the independent claims. The dependent claims relate to advantageous refinements and embodiments. Further features, possible uses and advantages of the invention will emerge from the following description and from the explanation of exemplary embodiments of the invention which are illustrated in the figures.

The above object is achieved according to claim 1 by means of a bistable fluid valve which has the following features:

- two valve chambers which are arranged adjacent to one another and are closed off with respect to one another by a partition and each have an inlet opening and an outlet opening situated opposite one another;
- an elastic strip element which is deformable in an S-shape owing to preload in a longitudinal direction and which extends through both valve chambers, is articulatedly mounted in the region of the partition and is articulatedly supported, at its two ends, on the inside of the valve chambers, and can assume two positions in which it sealingly closes off either one or the other outlet opening;
- an actuation element which is fastened to the strip element and by means of which the strip element can be switched between the two positions.

The bistable fluid valve according to the invention is characterized in that only a single moving component of very low mass is provided, in the form of the elastic strip element, which can therefore operate in a fast-reacting manner. Said bistable fluid valve is suitable in particular for being integrated into the head of a piston pump.

In one advantageous refinement of the invention, the strip element closes off, in the manner of a check valve, in each case the inlet opening of that valve chamber in which, in this position, the associated outlet opening is not closed off. The valve thus performs both the function of a switching valve and also simultaneously the function of a check valve for the open duct.

According to one advantageous refinement of the invention, the actuation element is fastened to the strip element in the vicinity of the central articulation point. This permits simple actuation. The closer the actuation element is to the articulation point, the greater is the required actuation force but the smaller is the required actuation travel, and vice versa.

In one advantageous refinement of the invention, the strip element is in the form of a metal strip. In this way, said strip element can be formed in a structurally simple manner and with low susceptibility to wear.

In one advantageous refinement of the invention, the strip element has elastic seal coatings in the region of the sealing regions with respect to the outlet openings, in order to ensure reliable sealing. It is also advantageous for the sealing surfaces for the strip element, that is to say the edges of the inlet openings and outlet openings, to be adapted to the curved form of the strip element in order to ensure a uniform contact pressure and thus a uniform sealing action.

In one advantageous refinement of the invention, the partition is composed of two seal bands. This arrangement realizes, in a structurally simple manner, both reliable sealing of the two chambers with respect to one another and also a particularly simple articulation point for the strip element.

In one advantageous refinement of the invention, the two outlet openings are connected to one another downstream of the fluid valve. In the case of this design, a switching valve is realized in which one of the two inlet openings is connected to the valve outlet and the other inlet opening is closed off.

In one advantageous refinement of the invention, the two inlet openings are connected to one another upstream of the fluid valve. In the case of this design, a switching valve is realized in which a valve inlet is connected alternatively to one or the other outlet opening and the respective other outlet opening is closed off.

In one advantageous refinement of the invention, the strip element is supported at least at one end on an adjustment screw for adjustment of the preload force. It is thus possible for the switching characteristic to be adapted to the conditions, in particular for the force required for switching to be adjusted.

It is preferable if the strip element is supported at both ends on two adjustment screws for adjustment of the preload force in order that no asymmetry of the strip element is generated in the case of relatively large adjustment travels.

In one advantageous refinement of the invention, the strip element has passages for the passage of fluid, but not in the region for coverage of the outlet openings. In this way, the flow in the open valve chamber is hindered only to a very minor extent. The passages may be in the form of holes. It is alternatively also possible for the strip element to be of relatively narrow design and to be of widened form only in the regions where the openings are to be covered.

In one advantageous refinement of the invention, said fluid valve is integrated into the head of a piston pump, in particular of a piezo pump. This saves installation space and it is possible to dispense with a separate directional valve.

Further advantages, features and details will emerge from the following description in which—with reference to the drawing where appropriate—at least one exemplary embodiment is described in detail. Identical, similar and/or functionally identical parts are denoted by the same reference signs.

Figure 2:
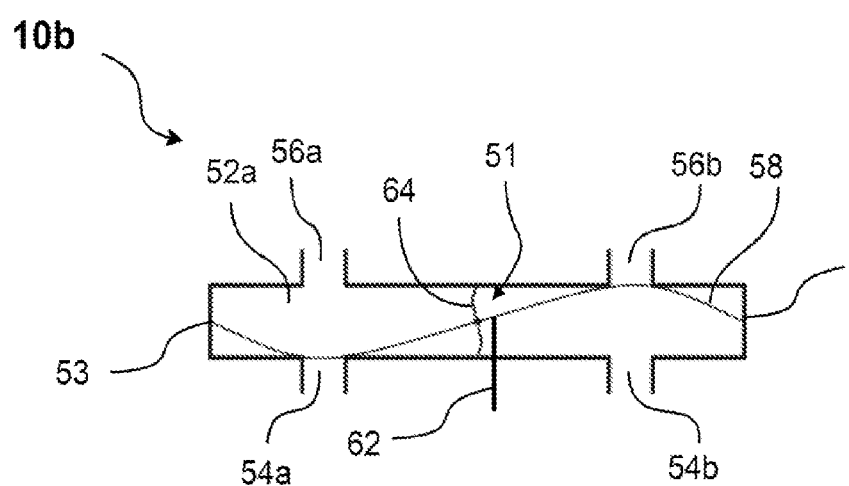

In the drawing:

FIG. 1. is a schematic illustration of a first embodiment of a fluid valve in two positions;

FIG. 2. is a schematic illustration of a second embodiment of a fluid valve.

FIG. 1 is a schematic illustration of a first embodiment of a fluid valve 10a in two positions. Said fluid valve is composed of two valve chambers 52a, 52b which are separated from one another by means of a seal 50. The two valve chambers 52a, 52b have in each case one inlet opening 54a, 54b and one outlet opening 56a, 56b. The two inlet openings 54a, 54b preferably communicate with one another in a manner which is not shown. Extending in the interior of the two valve chambers 52a, 52b there is an S-shaped elastic strip element 58 which is pivotably mounted centrally in the seal 50 and which is articulatedly supported, at the two ends 53, on two adjustment screws 60a, 60b. The seal 50 thus forms an articulation point 51 for the strip element 58.

The strip element 58 has the function of a valve flap which is variable in position and which presses with a defined preload force against the valve seat of in each case one outlet opening 56a, 56b and thus closes the latter. The fluid pressure presses the strip element 58 against the valve seat and thus increases the pressure force and the sealing effect. The situation is preferably identical at the inlet openings 54a and 54b. The difference consists in that the fluid pressure pushes the strip element 58 away from the valve seat and, in the presence of an adequate pressure level, flow can pass said valve seat, whereas a return flow is prevented.

The strip element 58 is designed such that, in the case of an open valve, the fluid flow can pass the strip element 58 unhindered from the inlet side to the outlet side. For this purpose, the strip element 58 is provided with passages (not shown) on the inlet side and on the outlet side, but not in the regions for coverage of the inlet openings 54a, 54b and outlet openings 56a, 56b. The fluid can thus flow substantially unhindered from the inlet openings 54a, 54b to the outlet openings 56a, 56b when the strip element 58 is in a position in which it covers the inlet opening 54b, because, in this case, the fluid can lift the strip element 58 from the seat in the manner of a check valve and flow past said strip element. In the other chamber 52b, however, the strip element 58 lies sealingly over the outlet opening 56b and prevents an outflow of fluid through the outlet opening 56b. Of the four openings 54a, 54b, 56a, 56b that are provided, in each case one inlet opening 54a, 54b and one outlet opening 56a, 56b is covered in each position. Thus, with alternating position of the strip element 58, the fluid flow can be reversed. The strip element 58 thus performs the function of a check valve and, in combination with the piston pump 16 or other pulsating fluid sources, the function of a flow-reversing valve. The strip element 58 thus performs the function of a check valve and of a flow-reversing valve.

To move the strip element 58 from the position shown at the top in FIG. 1 into the position shown at the bottom in FIG. 1, the strip element 58 is actuated by means of an actuation device 62. By virtue of a force being introduced externally via the actuation device 62, it is possible for the strip element 58 to be "snapped over", and thus switched back and forth from one position to the other position as desired. This permits a change in direction of the fluid flow. In the figures, the actuation device 62 is illustrated as a thrust rod that acts on the strip element 58 in translational fashion substantially perpendicular to the direction of extent.

Alternatively, it is also possible for the actuation device 62 to be in the form of a rotary element which acts on the central bearing point, for example as a rotary axle oriented perpendicular to the plane of the drawing.

In FIG. 1, the fluid flows that are possible in the two positions are indicated by arrows. On the right in FIG. 1, there are illustrated equivalent circuit diagrams for the valve functions, that is to say in the position shown at the top in FIG. 1, the left-hand chamber 52a operates as a closed valve whereas the right-hand chamber 52b operates as a check valve. In the position shown at the bottom of FIG. 1, the situation is reversed. By means of the adjustment screws 60a, 60b, the preload force can be varied in order to adapt the snap-over behavior or the contact pressure. Said design is particularly advantageous for pistons, in particular piezo pumps, because fluid flow rectification and fluid flow reversal can be performed in one element.

FIG. 2 is a schematic illustration of a second embodiment of a fluid valve 10b which corresponds substantially to that of FIG. 1. By contrast to the embodiment of FIG. 1, this embodiment uses not a seal 50 but rather a solid-state articulation point 64. This embodiment otherwise corresponds and operates in the same way as that described in FIG. 1.

Where fluid is referred to within the context of the invention, this is intended to mean any substantially incompressible fluid, preferably hydraulic fluid.

LIST OF REFERENCE SIGNS 10 a, b Fluid valve
50 Seal
51 Articulation point
52 a, b Valve chamber
54 a, b Inlet opening
56 a, b Outlet opening
58 Strip element
60 a, b Adjustment screws
62 Actuation device
64 Solid-state articulation point

The invention claimed is:
1. Bistable fluid valve, characterized by
two valve chambers which are arranged adjacent to one another and are closed off with respect to one another by a partition and each have an inlet opening and an outlet opening situated opposite one another;
an elastic strip element which is deformable in an S-shape owing to preload in a longitudinal direction and which extends through both valve chambers, is articulatedly mounted in the region of the partition and is articulatedly supported, at its two ends, on the inside of the valve chambers, and can assume two positions in which it sealingly closes off either one or the other outlet opening;
an actuation element which is fastened to the strip element and by means of which the strip element can be switched between the two positions,
wherein other than the inlets and the outlets, the chambers are sealed.
2. Fluid valve according to claim 1, characterized in that the strip element closes off, in the manner of a check valve, in each case the inlet opening of that valve chamber in which, in this position, the associated outlet opening is not closed off.
3. Fluid valve according to claim 1, characterized in that the actuation element is fastened to the strip element in the vicinity of the central articulation point.
4. Fluid valve according to claim 1, characterized in that the strip element is in the form of a metal strip.
5. Fluid valve according to claim 1, characterized in that the strip element has elastic seal coatings in the region of the sealing regions with respect to the outlet openings.
6. Fluid valve according to claim 1, characterized in that the partition is composed of two seal bands.
7. Fluid valve according to claim 1, characterized in that the two outlet openings are connected to one another downstream of the fluid valve.
8. Fluid valve according to claim 1, characterized in that the two inlet openings are connected to one another upstream of the fluid valve.

9. Fluid valve according to claim 1, characterized in that the strip element is supported at least at one end on an adjustment screw for adjustment of the preload force.

10. Fluid valve according to claim 1, characterized in that the strip element is supported at both ends on two adjustment screws for adjustment of the preload force.

11. Fluid valve according to claim 1, characterized in that the strip element has passages for the passage of fluid, but not in the region for coverage of the outlet openings.

12. Fluid valve according to claim 1, characterized in that said fluid valve is connected as a flow-reversing valve.

13. Fluid valve according to claim 1, characterized in that said fluid valve is integrated into the head of a piston pump.

14. Fluid valve according to claim 1, characterized in that said fluid valve is integrated into the head of a piezo pump.

15. Fluid valve according to claim 1, characterized in that the chambers are separated from one another by a seal.

16. Fluid valve according to claim 1, characterized in that when the elastic strip element assumes a first position of the two positions, with respect to the two chambers, of the openings in a first chamber of the two chambers, there is only an inlet opening open, and of the openings in a second chamber of the two chambers, there is only an outlet opening open.

17. Fluid valve according to claim 16, characterized in that when the elastic strip element assumes a second position of the two positions, with respect to the two chambers, of the openings in the first chamber of the two chambers, there is only an outlet opening open, and of the openings in the second chamber of the two chambers, there is only an inlet opening open.

18. Fluid valve according to claim 1, characterized in that the inlets and the outlets of the valve consist of the two inlet openings and the two outlet openings.

19. A fluid management system, comprising:
the fluid valve according to claim 1, wherein
the fluid of the fluid management system is incompressible fluid.

20. A hydraulic system, comprising:
the fluid valve according to claim 1, wherein
the fluid valve is configured to at least one of reverse or shut off volume flow of hydraulic fluid.

21. A hydraulic system, comprising:
the fluid valve according to claim 1.

22. A hydraulic system, comprising:
the fluid valve according to claim 1, wherein
the fluid valve is a directional flow valve.

23. Fluid valve according to claim 1, characterized in that the chambers are sealed by a seal.

24. Fluid valve according to claim 23, characterized in that the seal forms an articulation point for the strip element.

25. Fluid valve according to claim 1, characterized in that the chambers are sealed by a solid-state articulation point.

26. Fluid valve according to claim 25, characterized in that the solid-state articulation point forms an articulation point for the strip element.

27. Bistable fluid valve, characterized by
two valve chambers which are arranged adjacent to one another and are closed off with respect to one another by a partition and each have an inlet opening and an outlet opening situated opposite one another;
an elastic strip element which is deformable in an S-shape owing to preload in a longitudinal direction and which extends through both valve chambers, is articulatedly mounted in the region of the partition and is articulatedly supported, at its two ends, on the inside of the valve chambers, and can assume two positions in which it sealingly closes off either one or the other outlet opening;
an actuation element which is fastened to the strip element and by means of which the strip element can be switched between the two positions, wherein said fluid valve is integrated into the head of a piston pump.

28. Bistable fluid valve, characterized by
two valve chambers which are arranged adjacent to one another and are closed off with respect to one another by a partition and each have an inlet opening and an outlet opening situated opposite one another;
an elastic strip element which is deformable in an S-shape owing to preload in a longitudinal direction and which extends through both valve chambers, is articulatedly mounted in the region of the partition and is articulatedly supported, at its two ends, on the inside of the valve chambers, and can assume two positions in which it sealingly closes off either one or the other outlet opening;
an actuation element which is fastened to the strip element and by means of which the strip element can be switched between the two positions, wherein said fluid valve is integrated into the head of a piezo pump.

29. Bistable fluid valve, characterized by
two valve chambers which are arranged adjacent to one another and are closed off with respect to one another by a partition and each have an inlet opening and an outlet opening situated opposite one another;
an elastic strip element which is deformable in an S-shape owing to preload in a longitudinal direction and which extends through both valve chambers, is articulatedly mounted in the region of the partition and is articulatedly supported, at its two ends, on the inside of the valve chambers, and can assume two positions in which it sealingly closes off either one or the other outlet opening;
an actuation element which is fastened to the strip element and by means of which the strip element can be switched between the two positions, wherein the strip element is supported at least at one end on an adjustment screw for adjustment of the preload force.

* * * * *

UNITED STATES PATENT AND TRADEMARK OFFICE
CERTIFICATE OF CORRECTION

PATENT NO.        : 9,441,743 B2  
APPLICATION NO.   : 14/345186  
DATED             : September 13, 2016  
INVENTOR(S)       : Stefan Storm et al.

Page 1 of 1

It is certified that error appears in the above-identified patent and that said Letters Patent is hereby corrected as shown below:

On the Title Page

Please change the assignee as follows:

(73) Assignee: AIRBUS DEFENCE AND SPACE GMBH,
               Ottobrunn (DE)

Signed and Sealed this
Fourth Day of April, 2017

Michelle K. Lee
*Director of the United States Patent and Trademark Office*